United States Patent [19]
Lippert

[11] Patent Number: 5,213,747
[45] Date of Patent: May 25, 1993

[54] METHODS OF MAKING FIBER-REINFORCED RESIN MOLDS

[76] Inventor: William Lippert, 398 Wildwood Ridge, Colgate, Wis. 53017

[21] Appl. No.: 750,042

[22] Filed: Aug. 27, 1991

[51] Int. Cl.$^5$ ............................................. B29C 33/40
[52] U.S. Cl. ................................... 264/226; 264/255; 264/257
[58] Field of Search ............... 264/220, 225, 226, 255, 264/257, 258

[56] References Cited

U.S. PATENT DOCUMENTS

| | | | |
|---|---|---|---|
| 3,431,320 | 3/1969 | Baum et al. | 525/27 |
| 3,701,748 | 10/1972 | Kroekel | 264/331.18 |
| 3,886,229 | 5/1975 | Hutchinson et al. | 525/27 |
| 4,043,853 | 8/1977 | Saladino | 264/225 |
| 4,062,826 | 12/1977 | Hutchinson et al. | 523/512 |
| 4,276,388 | 6/1981 | Iwami et al. | 525/49 |
| 4,298,711 | 11/1981 | Moulson et al. | 525/40 |
| 4,348,499 | 9/1982 | Nelson | 525/49 |
| 4,525,498 | 6/1985 | Atkins et al. | 523/511 |
| 4,673,706 | 6/1987 | Atkins et al. | 525/31 |
| 4,834,929 | 5/1989 | Dehoff et al. | 264/226 |
| 4,925,611 | 5/1990 | Shockney et al. | 264/225 |
| 4,940,561 | 7/1990 | Fritz | 264/225 |

FOREIGN PATENT DOCUMENTS

WO87/00482 1/1987 PCT Int'l Appl. .................. 264/225

Primary Examiner—Jay H. Woo
Assistant Examiner—Robert B. Davis
Attorney, Agent, or Firm—Fuller, Ryan, Hohenfeldt & Kees

[57] ABSTRACT

A three-dimensional master of the article to be molded is provided. The surface of the master is coated with a mold release agent. A gel coat layer is then applied to the mold release agent coated surface of the master, and cured at about room temperature and preferably no greater than 55° C., until the cured surface feels slightly tacky. At least one fiber-reinforced catalyzed resin layer is then applied to the cured gel coat layer and cured. The resin layer includes a room temperature curing, low shrinkage thermosetting filled paste system including 25 to 75 percent of an unsaturated polyester resin, 1 to 25 weight percent of a mixture of thermoplastic polymers of vinyl acetate, an epoxy compound having at least one 1,2-epoxy group per molecule, and 25 to 75 percent filler. The resin is preferably cured at room temperature for about 30 minutes to 4 hours using a free radical initiator which is mixed with the resin as it is being applied. After curing, the thus formed mold is removed from the three-dimensional master.

19 Claims, 2 Drawing Sheets

METHODS OF MAKING FIBER-REINFORCED RESIN MOLDS

FIELD OF THE INVENTION

This invention relates to a method of making molds, and more particularly to a method of making a mold suitable for use in molding reactive polymer (e.g., unsaturated polyester resins) shaped articles and the like.

BACKGROUND OF THE INVENTION

The making of fiberglass reinforced plastic ("FRP") molds is a labor intensive and time-consuming process. Conventionally, a mold is made by hand laying-up multiple layers, one or two layers at a time, of a fiberglass mat impregnated with an unsaturated polyester, vinyl ester or epoxy resin. Each layer is hand rolled to remove air bubbles and allowed to cure for extended periods (e.g., four to 24 hours). This slow, methodical process is required to minimize volume shrinkage and the adverse affects of exothermic conditions that occur while the resin is polymerizing and reaching ultimate cure. Exemplary adverse affects include craze cracking, heat or thermal distortion, surface distortion, dimensional changes and internal stressing. Additionally, the molds, particularly large, long molds (e.g., molds for boat hulls) require post-construction stress processes to relieve warpage of the mold. Finally, the molds often have to be buffed and sanded over an extended period in order to obtain the desired surface finish, particularly when a smooth Class A finish article being molded is desired, such as in molding automobile body parts.

The resulting mold also must be resistant to heat distortion during use. Exothermic conditions of curing and the heat needed to cure some unsaturated polyester resins and other thermosetting resins tend to also cause heat distortion, warpage, craze cracking and the like. Conventional thinking in mold making is to use only those reactive polymers that have a high heat distortion temperature (e.g., distorts at temperatures above 120° C.) so that the exothermic properties of reactive polymers during cure do not exceed the tooling resin heat distortion temperature. Thus, the selection of reactive polymers is limited to those that have heat distortion temperatures and $T_g$'s above 100° C. Resins having low heat distortion temperatures (e.g., below 90° C.) and that cure at room temperature have heretofore not been used in the making of fiberglass reinforced molds.

Thus, there exists a need for a mold making process that produces a fiberglass reinforced plastic mold quickly, without the need for time-consuming multiple hand laying-up steps and extended time periods for curing, while minimizing volume shrinkage and the adverse affects of exothermic conditions during both the making and in the actual use of the fiberglass reinforced mold.

SUMMARY OF THE INVENTION

With the foregoing in mind, it is an object of the invention to provide an improved method of making molds which eliminates the need for time-consuming multiple hand laying-up steps and curing periods.

It is a further object of the invention to provide an improved method of making molds wherein the molds are substantially stress free, have essentially zero volume shrinkage and are warp-free.

It is still another object of the invention to provide an improved method of making molds which requires minimum post-construction processes and results in smooth Class A surface articles molded using the mold.

It is yet another object of the invention to provide a method of making molds wherein the molds resist heat distortion during making and during use.

These and other objects of the invention are provided by the method of the present invention. A three-dimensional master of the article to be molded is provided. Preferably, the master is formed to the exact size of the desired article The surface of the master is coated with a mold release agent (e.g., waxes, Teflon®, polyvinyl alcohol, etc.). A gel coat layer is then applied to the mold release agent coated surface of the master, and cured at about room temperature, and preferably no greater than 55° C., for about 1 to 4 hours to a light tacky feel. The gel coat layer is typically a 25 to 50 mils thick layer of an unsaturated polyester or vinyl ester resin. At least one fiber-reinforced resin layer is then applied to the cured gel coat layer and cured. The resin layer comprises a room temperature curing, low shrinkage thermosetting filled paste system comprising 25 to 75 percent of an unsaturated polyester resin; 1 to 25 weight percent of thermoplastic polymers of vinyl acetate and an epoxy compound having at least one 1,2-epoxy group per molecule; and 25 to 75 percent filler. The resin is preferably cured at room temperature using a free radical initiator which is mixed with the resin as it is being applied. After curing, the thus formed mold is removed from the three-dimensional master. The mold is resistant to volume shrinkage, craze cracking, heat distortion, surface distortion, internal stressing and signs of warpage.

BRIEF DESCRIPTION OF THE DRAWINGS

Some of the features and advantages have been stated, others will become apparent from the detailed description which follows, and from the accompanying drawings, in which.

DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein. Rather, applicant provides these embodiments so that this disclosure will be thorough and complete, and will fully convey the scope of the invention to those skilled in the art. Like numbers refer to like elements throughout.

Figure 1:
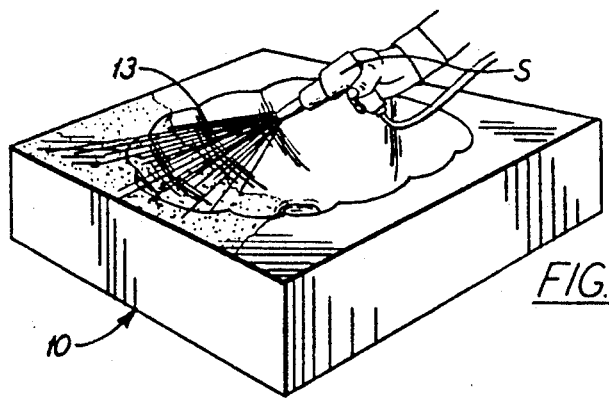
FIGS. 1-8 are sectional views illustrating the various steps for making an open mold according to the present invention

FIGS. 1-8 disclose the various method steps of the present invention. Referring now to FIG. 1, the three dimensional master 10 of the article to be molded is shown with a mold release agent 13 being applied thereto with a spray gun S. Exemplary mold release agents include waxes, Teflon® (polytetrafluoroethylene), polyvinyl alcohol and the like. The three-dimensional master 10 can be formed or molded from clay, wood, plastic, foam, etc., combinations thereof, or can be the actual article itself. Preferably, the master is formed to be the exact size of the article to be molded which eliminates much of the concern for problems associated with volume shrinkage.

Figure 2:
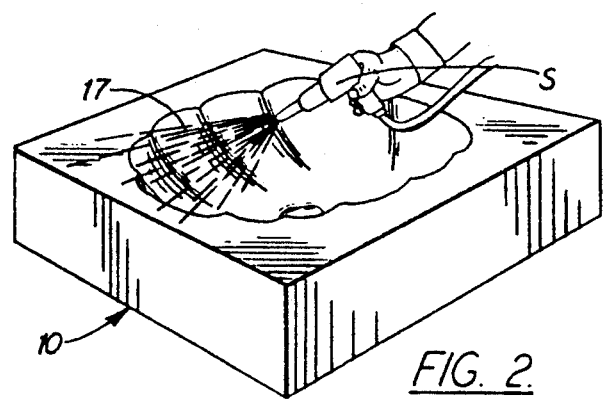

Referring now to FIG. 2, a gel coat layer 17 is applied with a spray gun S to a thickness of about 25 t about 50 mils and cured. The gel coat layer 17 is typically a tooling gel coat which is easily sanded and buffed. An exemplary tooling gel coat is an isophthalic polyester resin gel coat available from H. K. Research, Inc., Hickory, N.C. Additionally, the gel coat layer 17 should be able to dissipate heat, and preferably includes a filler such as aluminum powder to facilitate heat dissipation and can be colored for aesthetic purposes. Curing is accomplished preferably at room temperature, but can be done at temperatures up to about 55° C. for a period of 10 minutes to about four hours to a light tacky feel.

Figure 3:
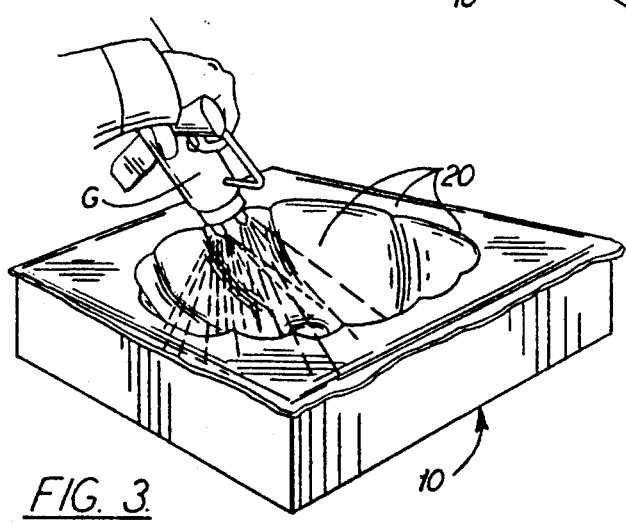
Figure 4:
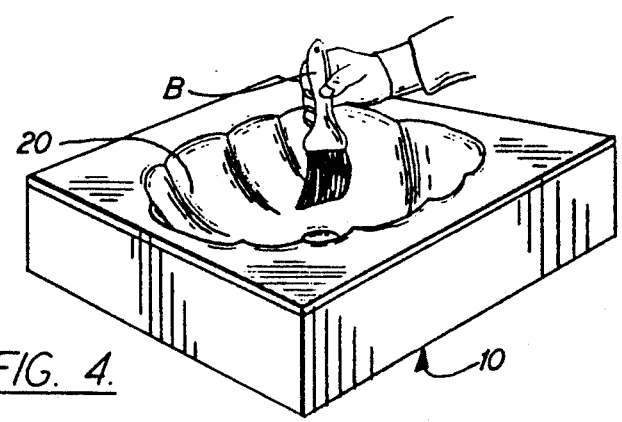

Referring now to FIG. 3, at least one fiber-reinforced resin layer 20 is applied to the cured gel coat layer 17 to a thickness of about ⅛ inch (3 mm) to about ¼ inch (6 mm). Preferably a chopper gun G is used wherein the fibers are chopped to a length of about ½ inch (1.27 cm) to about 2 inch (5 cm) and sprayed out simultaneously with the resin and a free radical initiator using a unitary nozzle or multiple nozzle system (such as shown in FIG. 3). The amount of glass fiber is about 5 to 50 percent by weight and preferably is about 12 to about 25 percent by weight of the resin layer. The fibers are preferably glass although other fibers such as carbon, Kevlar ®, (aramid), Nomex ® (nylon), etc., can be used. As shown in FIG. 4, the applied resin layer 20 resin is brushed with a brush B and/or rolled to remove air bubbles. The inside corners of the master can be filled by hand with a filled resin paste prior to applying the resin layer. This facilitates avoiding air bubbles or air pockets in these tight radii.

The resin layer is cured, preferably at room temperature, although temperatures up to about 100° C. can be used, for 15 minutes to about four hours. Excess resin is then trimmed off the mold using conventional techniques. Multiple catalyzed resin and reinforcement layers can be applied depending on the mold size and stiffness/strength required as described previously, with the typical thickness thereof being ⅛ inch to about ¼ inch. Preferably, the initial layer is a thin layer (e.g., about ⅛ inch) and the remaining layers thicker (e.g., about ¼ inch). The total number of layers and applications thereof will be within the skill of one in the art.

Figure 5:
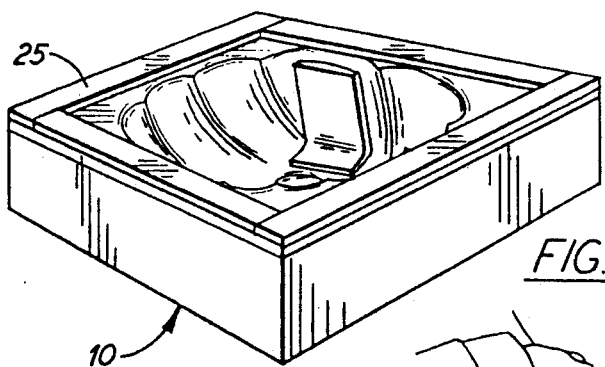
Figure 6:
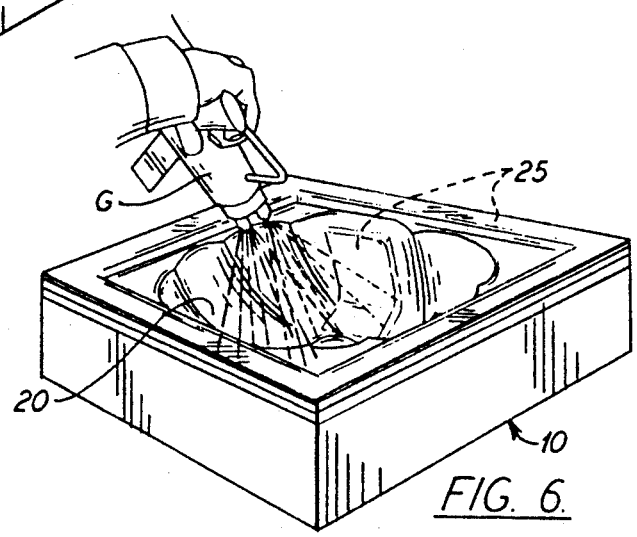

As shown in FIG. 5, in a preferred embodiment, substantially rigid reinforcement means 25 can be positioned after the initial reinforced resin layer 20 is applied. As shown in FIG. 6, a second reinforced resin layer is then applied over the reinforcement means and cured as discussed previously. The steps of positioning reinforcement means and applying additional resin layers can be repeated. The selection of the number of layers and the thickness thereof will be within the skill of one in the art. Exemplary reinforcement means can include wood (e.g., balsa), metal, woven roving, and the like. Additionally, framework formed from wood or metal tubing can be added to the back side of the mold to increase the strength of the mold, particularly when the mold is for molding large parts or a substantially deep article such as a vanity top. Additionally such framework can facilitate moving the mold for use in molding articles. The framework can be fabricated in the same manner as the mold.

Figure 7:
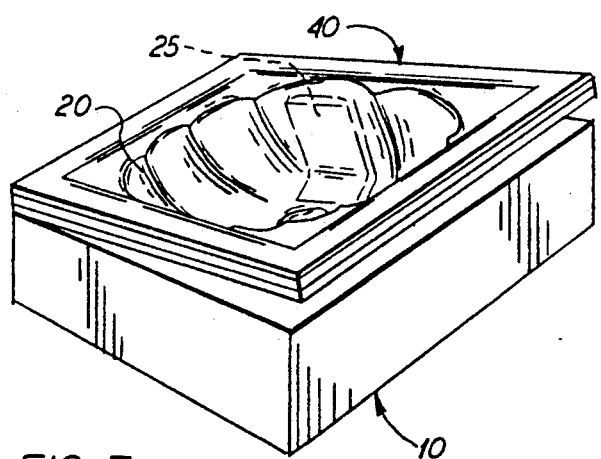
Figure 8:
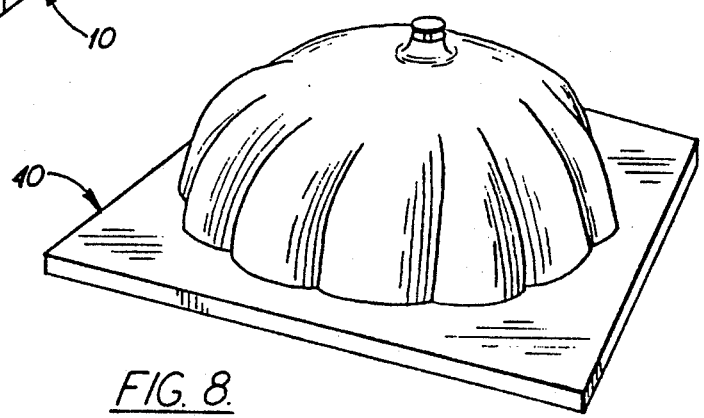

FIG. 7 illustrates the resulting open mold 40 being removed from the master 10. The mold 40, shown inverted in FIG. 8, can be used to mold various reactive polymer shaped articles such as sink basins, vanity tops, tubs, shower units, boat hulls, boat decks, automobile parts, storage tanks, aerospace parts and the like using open and closed mold techniques. Exemplary reactive polymers include unsaturated polyester resins, vinyl esters, urethanes, epoxy resins and the like. The mold 40 is resistant to volume shrinkage, craze cracking, heat distortion, surface distortion, internal stressing and warpage.

The fiber-reinforced resin layer 20 is a room temperature curing, low shrinkage, thermosetting filled paste system. Suitable fibers for reinforcing the resin are preferably glass although other fibers such as carbon, Kevlar ®, Nomex ® and the like. The room temperature curing, low shrinkage thermosetting filled paste system comprises 25 to 75 percent by weight, and preferably 40 to 60 percent by weight of an unsaturated polyester resin, 1 to 25 percent by weight, and preferably 1 to 10 percent by weight of a mixture of thermoplastic polymers of vinyl acetate and an epoxy compound having at least one 1,2-epoxy group per molecule and 25 to 75 percent by weight, and preferably 40 to 60 percent by weight of a filler. Preferably, the unsaturated polyester resin and the thermoplastic polymers of vinyl acetate are styrenated. The filled paste system can include various additives commonly employed in unsaturated polyester resin compositions such as promoters (e.g., cobalt napthenate and cobalt octoate), accelerators, (e.g., dimethylaniline, diethylamine, and the like and/or inhibitors (e.g., hydroquinone, p-benzoquinone, monotertiary butyl hydroquinone, tertiary butyl catechol, etc., and other additives for imparting desirable properties such as hardness, flame retardancy, impact strength, air release, thixotropic properties and the like.

Suitable unsaturated polyester resins are preferably those that cure at room temperature and include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethyene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, maleic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like.

The amount of unsaturated polyester polymer in the resin system ranges from about 25 percent to about 75 percent by weight of the total resin system. The amount of crosslinking monomer is about 10 percent to about 65 percent by weight of the resin system.

The polyester resin can also be mixed or blended with other thermosetting resins For example, the polyester resin can be mixed with a crosslinkable polyurethane such as described in U.S. Pat. No. 4,062,826 to Hutchinson et al, the disclosure of which is incorporated herein by reference. The use of other thermosetting resins and blends thereof will be within the skill of one in the art.

Exemplary mixtures of thermoplastic polymers of vinyl acetate and of epoxy compounds having at least one 1,2-epoxy group per molecule are described in U.S. Pat. No. 4,525,498 to Atkins et al the disclosure of which is incorporated herein by reference as disclosed in said patent the thermoplastic vinyl acetate polymers and the epoxy compounds each form at least one percent by weight of the filled paste system. Suitable thermoplastic vinyl acetate polymers are polyvinyl acetate homopolymers and thermoplastic copolymers containing at least 50 percent by weight vinyl acetate. Such polymers include, for example, vinyl acetate homopolymer; carboxylated vinyl acetate polymers including copolymers of vinyl acetate and ethylenically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer, and the like. The useful vinyl acetate polymers typically have molecular weights within the range of from about 10,000 to about 250,000, and preferably from about 25,000 to about 175,000.

Suitable epoxy compounds having at least one 1,2-epoxy group per molecule can be based on aliphatic, cycloaliphatic or aromatic backbones. One class of preferred thermosetting epoxy resins can be represented by the formula

wherein n is an integer representing the number of repeating units and has a value of 0 to about 10 and Z is an arylene radical having 6 to about 20 carbons. The preferred arylene radical is:

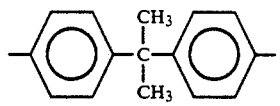

Still another preferred class of thermosetting epoxy resins are the 1,2-cycloaliphatic diepoxides such as 3,4-epoxycyclohexylmethyl 3,4-epoxycyclohexane carboxylate, bis(2,3-epoxycyclopentyl)ether, vinyl cyclohexane dioxide, and 2-(2,4-epoxycyclohexyl-5,5-spiro)-(3,4 epoxy)cyclohexane-m-dioxane. It is noted that the mixture has previously been used as a low profile additive ("LPA") in molding articles to reduce volume shrinkage such as described in U.S. Pat. No. 4,525,498 to Atkins, et al. However, heretofore such a mixture has not been used in making molds such as open or low pressure closed molds at room temperature and slightly above, and moreover in making molds using resins having a low heat distortion temperature A suitable resin system (without filler) is Polylite® 33540-00 available from Reichhold Chemical Inc., Research Triangle Park, N.C. Polylite® 33540-00 is a mixture of saturated acid-modified unsaturated polyester resin having a very high ethylenic unsaturation, XLPR-85D44 (a mixture of thermoplastic vinyl acetate and epoxy compound having at least one 1,2 epoxy group per molecule available from Union Carbide, Charleston, W. Va.), a cobalt octoate promoter, a dimethylaniline accelerator and a tertiary butyl catechol inhibitor. Exemplary fillers can include, among others, alumina powder, hydrated alumina, quartz powder, marble powder, crushed silica, calcium carbonate, clay, glass fibers, mixtures thereof and other mineral and inorganic particulates that contribute to the shrinkage, stiffness, strength and aesthetics of the finished mold. The fillers are used in amounts of about 25 to about 75 percent by weight.

An exemplary class of initiators for curing the resin are the free radical initiators. Examples are hydrogen peroxide, hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. The amount of initiator is about 0.5 to about 1.5 percent by weight based on resin, and preferably is mixed with the filled resin as it is being applied with the filled paste system to the gel coat layer.

The present invention and its advantages over the prior art will be more fully understood and appreciated from the illustrative example which follow. It is to be understood that the example is for the purpose of illustration and is not intended as being limiting upon the scope of the invention. A person skilled in the applicable arts will appreciate from this example that this invention can be embodied in many different forms other than as is specifically disclosed.

EXAMPLE

A three-dimensional master of a sink basin is formed from clay. Two coats of wax mold release agent are coated on the surface of the master. A 25 mil thick aluminum powder filled tooling gel coat layer is applied to the wax coated surface of the master. The gel coat layer is allowed to gel and cured for about 45 minutes at room temperature to a slightly tacky surface.

A paste mixture of a thermosetting resin system is prepared, the resin system comprising:

60 parts by weight Polylite ® 33540-00 resin, comprising:
- a. 87 percent by weight of a styrenated saturated acid-modified unsaturated polyester resin having a very high ethylenic unsaturation,
- b. 13 percent by weight Union Carbide, XLPR-85D44, a styrenated mixture of thermoplastic polymers of vinyl acetate and an epoxy compound having at least one 1,2 epoxy group per molecule and
- c. 0.1 percent by weight dimethylaniline accelerator, and
- d. 0.2 percent by weight cobalt octoate promoter
- e. 0.03 percent inhibitor, and 40 parts by weight hydrated aluminum filler. The above resin paste is used at 82 parts combined with 18 parts by weight chopped glass fibers, and 0.5 parts by weight methyl ethyl ketone peroxide and are applied through the use of a chopper gun and sprayed onto the gel coat layer to a thickness of about ⅛ inch. The layer is allowed to cure at 30° C. for one hour. Balsa reinforcement is added. The resin paste mixture, glass fiber and catalyst are then again sprayed onto the first layer and the balsa reinforcement to a thickness of ¼ inch. The layer is cured at 30° C. for one hour. Supporting framework is added to the backside of the mold. The mold is ready for production use. Molds constructed under this method have been used for molding over one thousand sink basins without heat distortion, surface distortion, internal stressing or signs of warpage.

In the drawings and specification there have been disclosed typical preferred embodiments of the invention and, although specific terms are employed, they are used in a generic and descriptive sense only and not for purposes of limitation, the scope of the invention being set forth in the following claims.

That which is claimed is:

1. A method of making a mold suitable for use in molding reactive polymer shaped articles comprising
   (a) providing a three-dimensional master of the article to be molded;
   (b) coating the surface of the three-dimensional master with a mold release agent;
   (c) applying a gel coat layer to the mold release agent coated surface of the master and curing the gel coat layer;
   (d) applying to the gel coat layer at least one fiber reinforced catalyzed resin layer, said resin layer comprising a room temperature curing, low shrinkage, thermosetting filled paste system comprising
   25 to 75 percent by weight of an unsaturated polyester resin,
   1 to 25 percent by weight of a mixture of thermoplastic polymers of vinyl acetate and an epoxy compound having at least one 1,2-epoxy group per molecule, and 25 to 75 percent by weight filler said mixture comprising vinyl acetate and said epoxy compound each in an amount equalling at least 1% by weight of the filled paste system
   (e) curing the resin layer using a free radical initiator; and
   (f) removing the thus formed mold from the three-dimensional master.

2. The method according to claim 1 wherein said step of providing a three-dimensional master of the article to be molded comprises forming the master in the exact size of the desired article.

3. The method according to claim 1 wherein the mold release agent is a wax.

4. The method according to claim 3 wherein said step of applying at least one fiber-reinforced resin layer includes applying the resin layer at a thickness of about ⅛ inch to about ¼ inch.

5. The method according to claim 1 wherein step (e) comprises curing the resin at room temperature for about fifteen minutes to about four hours.

6. The method according to claim 5 wherein the unsaturated polyester resin is a styrenated saturated acid-modified unsaturated polyester resin having a very high ethylenic unsaturation, the thermoplastic polymer is styrenated, the vinyl acetate is polyvinyl acetate and the epoxy compound is

wherein n is an integer representing the number of repeating units and has a value of 0 to about 10 and Z is an arylene radical having 6 to about 20 carbons.

7. The method according to claim 1 wherein the gel coat layer is an unsaturated polyester or vinyl ester resin.

8. The method according to claim 1 wherein the free radical initiator catalyst is methyl ethyl ketone peroxide.

9. The method according to claim 1 wherein steps (d) and (e) are repeated at least once.

10. A method a making a mold suitable for use in molding reactive polymer shaped articles comprising
   (a) providing a three-dimensional master of the article to be molded;
   (b) coating the surface of the three-dimensional master with a mold release agent;
   (c) applying a gel coat layer to the mold release agent coated surface of the master and curing the gel coat layer, the method comprising
   (d) applying to the gel coat layer a first fiber-reinforced resin layer, said resin layer comprising a room temperature curing, low shrinkage, thermosetting filled paste system comprising
   25 to 75 percent by weight of an unsaturated polyester resin,
   1 to 25 percent by weight of a mixture of thermoplastic polymers of vinyl acetate and an epoxy compound having at least one 1,2-epoxy group per molecule said mixture comprising vinyl acetate and said epoxy compound each in an amount equalling at least 1% by weight of the filled paste system, and 25 to 75 percent by weight filler and curing the same using a free radical initiator catalyst;

(e) placing reinforcement means on the fiber-reinforced resin layer;

(f) applying to the reinforcement means placed on the fiber-reinforced resin layer, a second fiber-reinforced resin layer and curing the same using a free radical initiator catalyst; and (g) removing the thus formed mold from the three-dimensional master.

11. The method according to claim 10 wherein said step of providing a three-dimensional master of the article to be molded comprises forming the master in the exact size of the desired article.

12. The method according to claim 10 wherein the mold release agent is a wax.

13. The method according to claim 10 wherein said step of applying at least one fiber-reinforced resin layer includes applying the resin layer at a thickness of about ⅛ inch to about ¼ inch.

14. The method according to claim 10 wherein the unsaturated polyester resin is a styrenated saturated acid-modified unsaturated polyester resin having a very high ethylenic unsaturation, the thermoplastic polymer is styrenated, the vinyl acetate is polyvinyl acetate and the epoxy compound is

wherein n is an integer representing the number of repeating units and has a value of 0 to about 10 and Z is an arylene radical having 6 to about 20 carbons.

15. The method according to claim 10 wherein step (d) includes curing the resin at room temperature for about fifteen minutes to about four hours.

16. The method according to claim 10 wherein the gel coat layer is an unsaturated polyester resin.

17. A method according to claim 10 wherein steps (e) and (f) are repeated at least once.

18. The method according to claim 10 wherein the reinforcement means are formed from balsa wood.

19. The method according to claim 10 wherein the free radical initiator catalyst is methyl ethyl ketone peroxide.

* * * * *